US011790241B2

(12) United States Patent
Reisser et al.

(10) Patent No.: US 11,790,241 B2
(45) Date of Patent: Oct. 17, 2023

(54) SYSTEMS AND METHODS FOR MODIFYING NEURAL NETWORKS FOR BINARY PROCESSING APPLICATIONS

(71) Applicant: QUALCOMM Incorporated, San Diego, CA (US)

(72) Inventors: Matthias Reisser, Weesp (NL); Saurabh Kedar Pitre, San Diego, CA (US); Xiaochun Zhu, San Diego, CA (US); Edward Harrison Teague, San Diego, CA (US); Zhongze Wang, San Diego, CA (US); Max Welling, Bussum (NL)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 17/016,130

(22) Filed: Sep. 9, 2020

(65) Prior Publication Data

US 2021/0073650 A1 Mar. 11, 2021

Related U.S. Application Data

(60) Provisional application No. 62/897,934, filed on Sep. 9, 2019.

(51) Int. Cl.
*G06F 17/16* (2006.01)
*G06N 3/10* (2006.01)
*G06N 3/047* (2023.01)

(52) U.S. Cl.
CPC ............... *G06N 3/10* (2013.01); *G06F 17/16* (2013.01); *G06N 3/047* (2023.01)

(58) Field of Classification Search
CPC .......... G06F 17/16; G06N 3/10; G06N 3/045; G06N 3/065; G06N 3/08
(Continued)

(56) References Cited

U.S. PATENT DOCUMENTS

2005/0125477 A1 6/2005 Genov et al.
2020/0117519 A1* 4/2020 Chen ...................... G06N 3/088
(Continued)

FOREIGN PATENT DOCUMENTS

WO 2019001418 A1 1/2019

OTHER PUBLICATIONS

Agrawal A., et al., "Xcel-RAM: Accelerating Binary Neural Networks in High-Throughput SRAM Compute Arrays", IEEE Transactions on Circuits and Systems I: Regular Papers, arXiv:1807.00343v2 [cs.ET] Oct. 22, 2018, 10 Pages.
(Continued)

*Primary Examiner* — Tan V Mai
(74) *Attorney, Agent, or Firm* — Patterson + Sheridan LLP

(57) ABSTRACT

In one embodiment, a method of simulating an operation of an artificial neural network on a binary neural network processor includes receiving a binary input vector for a layer including a probabilistic binary weight matrix and performing vector-matrix multiplication of the input vector with the probabilistic binary weight matrix, wherein the multiplication results are modified by simulated binary-neural-processing hardware noise, to generate a binary output vector, where the simulation is performed in the forward pass of a training algorithm for a neural network model for the binary-neural-processing hardware.

23 Claims, 6 Drawing Sheets

600

(58) Field of Classification Search
USPC .......................................................... 708/607
See application file for complete search history.

(56) References Cited

U.S. PATENT DOCUMENTS

2020/0192598 A1* 6/2020 Kumar .................... G06F 17/11
2020/0356620 A1* 11/2020 Yen ....................... G06F 7/5443

OTHER PUBLICATIONS

Bengio Y., et al., "Estimating or Propagating Gradients Through Stochastic Neurons for Conditional Computation", Computer Science and Operations Research Department, Montreal University, Aug. 15, 2013, pp. 1-12, arXiv preprint arXiv: 1308.3432.v1 [cs.LG].
Courbariaux M., et al., "Binarized Neural Networks: Training Neural Networks with Weights and Activations Constrained to +1 or −1", University of Montreal, Mar. 17, 2016, 11 Pages, arXiv preprint arXiv:1602.02830v3 [cs.LG].
Elsken, T., et al., "Neural Architecture Search: A Survey", Journal of Machine Learning Research, vol. 20, No. 55, Mar. 2019, pp. 1-21, http://jmlr.org/papers/v20/18-598.html.
Gonugondla, S.K., et al., "A 42pj/Decision 3.12TOPS/W Robust in-Memory Machine Learning Classifier with on-Chip Training", IEEE International Solid-State Circuits Conference (ISSCC), 2018, pp. 490-492.
International Search Report and Written Opinion—PCT/US2020/049997—ISA/EPO—dated Jan. 13, 2021.
Ioffe S., et al., "Batch Normalization: Accelerating Deep Network Training by Reducing Internal Covariate Shift", International Conference on Machine Learning, Mar. 2, 2015, pp. 1-11, arXiv:1502.03167v3.
Jacob B., et al., "Quantization and Training of Neural Networks for Efficient Integer-Arithmetic-Only Inference", Dec. 15, 2017, 14 pages.
Jang E., et al., "Categorical Reparameterization with Gumbel-Softmax", ICLR 2017 Conference, Cornell University Library, 201 Olin Library Cornell University, Ithaca, NY 14853, Aug. 5, 2017, XP080729237, pp. 1-13, arXiv:1611.01144v5, abstract; figures 1-5, p. 1, line 1—p. 8, last line.
Kingma, D.P., et al., "Auto-Encoding Variational Bayes", ICLR 2014 Conference, Dec. 2013, pp. 1-14, arXiv preprint arXiv:1312.6114v10 [stat.ML].
Krizhevsky, A., "Learning Multiple Layers of Features from Tiny Images", Technical Report, Citeseer, Apr. 8, 2009, 60 Pages.
Lauwers, E., et al., "A Power Estimation Model for High-Speed CMOS A/D Converters", Design, Automation and Test in Europe Conference and Exhibition 1999, Proceedings (Cat. No. PR00078), IEEE, 1999, pp. 401-405.
Louizos, C., et al., "Relaxed Quantization for Discretized Neural Networks", ICLR 2019 Conference, Cornell University Library, 201 Olin Library Cornell University, Ithaca, NY 14853, Oct. 3, 2018, XP081057162, pp. 1-14, arXiv preprint arXiv: 1810.01875, abstract; figures 1-4 p. 1, line 1—p. 8, last line.
Maddison C.J., et al., "The Concrete Distribution: A Continuous Relaxation of Discrete Random Variables", ICLR 2017 Conference, Cornell University Library, 201 Olin Library Cornell University Ithaca, NY 14853, arXiv:1611.00712v3 [cs.LG], Mar. 5, 2017, XP080729141, pp. 1-20, Pages, abstract; figures 1-4 p. 1, line 1—p. 9, last line.
Peters, J.W.T., et al., "Probabilistic Binary Neural Networks", ICLR 2019 Conference, Sep. 10, 2018, pp. 1-10, arXiv:1809.03368v1 [cs.LG].
Qin, M., et al., "Training Recurrent Neural Networks against Noisy Computations during Inference", IEEE, 2018 52nd Asilomar Conference on Signals, Systems, and Computers, Jul. 17, 2018, pp. 1-10.
Srivastava, N., et al., "Dropout: A Simple Way to Prevent Neural Networks from Overfitting", Journal of Machine Learning Research, vol. 15, No. 1, Jun. 2014, pp. 1929-1958.
Tang, R., et al., "Honk: A PyTorch Reimplementation of Convolutional Neural Networks for Keyword Spotting", University of Waterloo, Ontario, Canada, Nov. 28, 2017, 3 Pages, arXiv preprint arXiv:1710.06554v2 [cs.CL].
Valavi, H., et al., "A 64-Tile 2.4-Mb in-Memory-Computing CNN Accelerator Employing Charge-Domain Compute", IEEE Journal of Solid-State Circuits, vol. 54, No. 6, Jun. 2019, pp. 1789-1799.
Verma, N., et al., "Enabling System-Level Platform Resilience Through Embedded Data-Driven Inference Capabilities in Electronic Devices", 2012 IEEE International Conference on Acoustics, Speech and Signal Processing (ICASSP), IEEE, Mar. 2012, pp. 5285-5288.
Warden, P., "Launching the Speech Commands Dataset", Google Research Blog, Aug. 24, 2017, 3 Pages.
Zhang, B., et al., "Stochastic Data-Driven Hardware Resilience to Efficiently Train Inference Models for Stochastic Hardware Implementations", ICASSP 2019-2019 IEEE International Conference on Acoustics, Speech and Signal Processing (ICASSP), IEEE, May 2019, pp. 1388-1392.
Zhang, J., et al., "In-Memory Computation of a Machine-Learning Classifier in a Standard 6T SRAM Array", IEEE Journal of Solid-State Circuits, vol. 52, No. 4, Apr. 2017, pp. 915-924.

* cited by examiner

Require: $x \in \{0,1\}^{c_{in} \times h \times w}$: Binary input. $w \in \{0,1\}^{c_{out} \times c_{in} \times k \times k}$: Binary weights. $N, M$: Height, width of CIM array(s). $b$: ADC/DAC bit-width. $\theta \in \mathbb{R}^{c_{out}}$: Thresholds.
$L = k \cdot k \cdot c_{in}$: Flattened input patch size.
$K \leftarrow \lceil L/N \rceil$: Number of required CIM arrays.
Split $w$ into $K$ parts $w_q \in \{0,1\}^{c_{out} \times c_{in,q} \times k \times k}$.
for q in K do
$\alpha'_q \sim \mathcal{N}(0, \sigma_\alpha^2), \beta'_q \sim \mathcal{N}(0, \sigma_\beta^2)$: Process variations.
$L_q \leftarrow k \cdot k \cdot c_{in,q}$: Volume of partial kernels.
$w_q \leftarrow reshape(w_q; L_q, c_{out})$
end for
for input patch $x_p$ do
$x_p \leftarrow reshape(x_p; L)$ Flatten input patch
if $L > N$ then
Split flattened $x_p$ into $K$ parts $x_{p,q} \in \{0,1\}^{L_q}$
for q in K do
Present $x_{p,q}$ on word lines
$o_q = PCNT_i^{L_q}(XNOR(x_{p,q,i}, w_{q,i}))$
$\gamma'_q \sim \mathcal{N}(0, \sigma_\gamma^2)$: I.i.d noise.
$\tilde{o}_{p,q} = \alpha'_q \cdot o_q + \beta'_q + \gamma'_q$
end for
$\tilde{o}_p \leftarrow \sum_q^K ADC_b(\tilde{o}_{p,q})$: Digitize and sum in digital.
$\hat{h}_p \leftarrow \tilde{o}_p > \theta$: Digital threshold comparison.
else
Present $x_p$ on word lines
$o_p = PCNT_i^L(XNOR(x_{p,i}, w_i))$
$\gamma' \sim \mathcal{N}(0, \sigma_\gamma^2)$: I.i.d noise.
$\tilde{o}_p = \alpha'_0 \cdot o + \beta'_0 + \gamma'$
$\hat{h}_p \leftarrow \tilde{o}_p > DAC_b(\theta)$: Comparator.
end if
Store feature map entries $\hat{h}_p$ corresponding to $x_p$.
end for
return $\hat{h}$

400

*FIG. 4* input $\hat{x} \in \{-1,+1\}^{c_{in}\times h\times w}$: Binary input. $w \in \mathbb{R}^{c_{out}\times c_{in}\times k\times k}$: Binary weight probabilities. $N, M$: Height, width of array(s). $b$: ADC/DAC bit-width. $f$: Convolutional operation.
$L = k \cdot k \cdot c_{in}$: Flattened input patch size.
$K \leftarrow \lceil L/N \rceil$: Number of required CIM arrays.
$\theta, w = batch_normalization(x, w)$
if $L > N$ then
  Split $\hat{x}$ into $K$ parts $x_q \in \{-1,+1\}^{c_{in,q}\times h\times w}$
  Split $\tilde{w}$ into $K$ parts $\tilde{w}_q \in \mathbb{R}^{c_{out}\times c_{in,q}\times k\times k}$
  for q in K do
    $L_q \leftarrow k \cdot k \cdot c_{in,k}$: Volume of partial kernel.
    $a_q = \mathcal{N}(f(\hat{x}_q, w_q), f(\hat{x}_q^2, (1-w_q)^2))$: CLT.
    $a_q' \sim a_q$: Sample partial gaussian pre-activations.
    $o_q = \frac{1}{2}a_q + \frac{L_q}{2}$: Transform to pop-count equivalent.
    $\alpha_q' \sim \mathcal{N}(0,\sigma_\alpha^2), \beta_q' \sim \mathcal{N}(0,\sigma_\beta^2), \gamma_q' \sim \mathcal{N}(0,\sigma_\gamma^2)$
    $\tilde{o}_q = \alpha_q' \cdot o_q + \beta_q' + \gamma_q'$
  end for
  $\hat{o} = \sum_q^K ADC_b(\tilde{o}_q)$: Digitize and sum pop-count.
  $\hat{a} = 2 \cdot \hat{o} - L$: Transform to $\{-1,+1\}$ domain.
  $\hat{h} = \text{Bin}(\hat{a} - \theta)$: Stochastic binary activations.
else
  $\mu_a, \sigma_a^2 \leftarrow f(\hat{x}, w), f(x^2, (1-w)^2))$: CLT
  $\mu_o, \sigma_o^2 \leftarrow \frac{1}{2}\mu_a + \frac{L}{2}, \frac{1}{4}\sigma_a$: Pop-count equivalent
  $\alpha' \sim \mathcal{N}(0,\sigma_\alpha^2), \beta' \sim \mathcal{N}(0,\sigma_\beta^2), \gamma' \sim \mathcal{N}(0,\sigma_\gamma^2)$
  $\mu_{\tilde{o}}, \sigma_{\tilde{o}}^2 \leftarrow \alpha'\mu_o + \beta' + \gamma', \alpha'^2\sigma_o$
  $\mu_{\hat{a}}, \sigma_{\hat{a}}^2 \leftarrow 2 \cdot \mu_{\tilde{o}} - L, 4 \cdot \sigma_{\tilde{o}}^2$: To $\{-1,+1\}$ domain.
  $\hat{h} = \text{Bin}(1-\Phi(DAC_b(\theta), \mu_{\hat{a}}, \sigma_{\hat{a}}^2))$: Stoch. activations.
end if
return $\hat{h}$

SYSTEMS AND METHODS FOR MODIFYING NEURAL NETWORKS FOR BINARY PROCESSING APPLICATIONS

This application claims priority to U.S. Provisional Patent Application No. 62/897,934 titled "SYSTEMS AND METHODS FOR MODIFIED NEURAL NETWORKS FOR COMPUTE-IN-MEMORY APPLICATIONS" and filed on Sep. 9, 2019, which is expressly incorporated by reference herein in its entirety.

BACKGROUND

The present disclosure relates generally to artificial neural networks for compute-in-memory (CIM) arrays.

Artificial neural network (ANN) applications are increasing in number and use. One particularly common type of ANN is a convolutional neural network (CNN), which is an ANN that includes one or more convolutional layers. A convolutional layer uses one or more kernels (also known as filters), which are arrays of weights, to process one or arrays of an input tensor and generate an output tensor. Running inferences with a CNN generally requires numerous computations to perform the many requisite tensor operations. Specifically, using CNNs requires performing a vast number of matrix multiplications involving multiplying arrays of weights by corresponding arrays of inputs (also called activations). The computational and power resources of any device are, however, limited. The resources of some electronic devices, such as, for example, mobile devices and Internet of Things (IoT) devices, are particularly limited in comparison to desktop or server devices. In addition, using conventional von-Neumann computing architectures, with their separated memory and processor modules, require moving large amounts of data between memory and processor registers, which tends to form bottlenecks in today's conventional hardware.

SUMMARY

Certain aspects of the present disclosure are directed to a method of simulating an operation of an artificial neural network on a binary neural network processor, comprising receiving a binary input vector for a layer comprising a probabilistic binary weight matrix, and performing vector-matrix multiplication of the input vector with the probabilistic binary weight matrix, wherein the multiplication results are modified by simulated binary-neural-processing hardware noise, to generate a binary output vector.

Certain aspects of the present disclosure are directed to an apparatus comprising a processor and a memory, the apparatus configured to simulate an operation of an artificial neural network on a binary neural network processor. The simulation comprises receiving a binary input vector for a layer comprising a probabilistic binary weight matrix and performing vector-matrix multiplication of the input vector with the probabilistic binary weight matrix, wherein the multiplication results are modified by simulated binary-neural-processing hardware noise, to generate a binary output vector.

Certain aspects of the present disclosure are directed to a non-transitory computer-readable medium storing computer-executable code for operation of a neural network, comprising code to simulate an operation of an artificial neural network on a binary neural network processor. The simulation comprises receiving a binary input vector for a layer comprising a probabilistic binary weight matrix and performing vector-matrix multiplication of the input vector with the probabilistic binary weight matrix, wherein the multiplication results are modified by simulated binary-neural-processing hardware noise, to generate a binary output vector.

Additional aspects, advantages, and features of the present disclosure may become apparent after review of the entire application.

BRIEF DESCRIPTION OF THE DRAWINGS

The disclosed embodiments will hereinafter be described in conjunction with the appended drawings, provided to illustrate and not to limit the disclosed embodiments, wherein like designations denote like elements, and in which:

FIG. 4 shows an exemplary algorithm for the simulated process of executing a convolution operation on a CIM chip in a non-shared setting.

FIG. 5 shows an exemplary algorithm describing the CIM training procedure from the view-point of an implementation in a deep learning framework.

DETAILED DESCRIPTION

Figure 1:
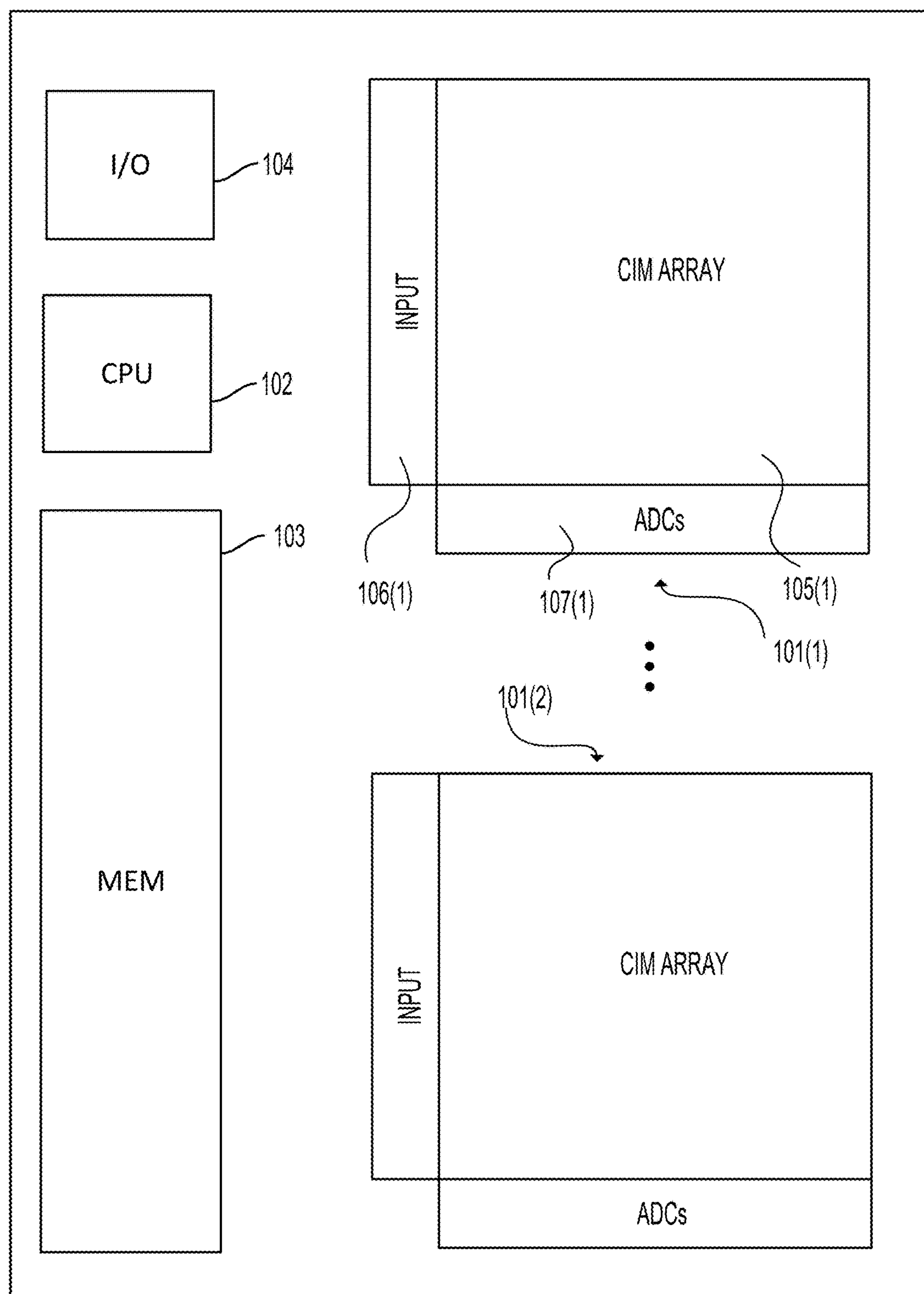
FIG. 1 is a simplified schematic diagram of an exemplary electronic computational device.

With reference to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

One newly emerging architecture that allows for a significant reduction in power used is the compute-in-memory (CIM) architecture. Some implementations of CIM devices use modified static random-access memory (SRAM) cells. Other implementations may use other types of memory cells (e.g., magnetoresistive RAM (MRAM) or resistive RAM (RRAM)). Exemplary electronic computing devices may contain single or multiple CIM arrays. In some embodiments, a CIM array may comprise an array of modified SRAM cells programmable to store weights of, for example, a corresponding CNN, where the cells are also configured to perform calculations with received input values. Note that CIM arrays may also be used by neural networks other than CNNs and, generally, CIM arrays are useful for performing any computations involving matrix multiplications. While a conventional electronic computing device comprises various digital-domain-computing components, a CIM electronic computing device combines digital-domain components, analog-domain components, and converter components to convert between the two. The conversions may introduce noise or other inaccuracies into the computations of the electronic computing device.

A binary neutral network (BNN), using binary activation and weights, achieves accuracy that is sufficient for many artificial intelligence (AI) tasks. A CIM array, as an analog-including implementation, is one of the best ways to implement a BNN. Using a BNN allows replacing MAC operations with bit-wise operations like XNOR and analog population counts. XNOR operations are used because XNOR operations on 0 and 1 correspond to multiplication operations on −1 and +1, respectively. Implementing a BNN in a CIM allows for power and time savings since each CIM storage unit is also a computation unit.

One challenge of using CIM devices for neural network acceleration arises from that the matrix multiplication happens in the analog domain, which is subject to noise. Noise might appear as a consequence of process, voltage, and temperature (PVT) variations in different forms dependent on the chip design. Other noise sources during operation might include drift or jitter of periodic signals. In some implementations, processing a layer may require splitting up and rejoining segments of the matrix-vector multiplication using analog-to-digital converters (ADCs), which introduces additional quantizing noise. ADCs and digital-to-analog converters (DACs) have resolutions of a finite number of bits and since the power use and chip area required by these converters scales with the resolution they provide, it is preferable to use low-bit converters. However, the lower the resolution, the greater the quantization noise added.

As noted above, a CIM chip contains one or more CIM arrays. Each array is designed to perform a binary matrix-vector multiplication—in other words, to multiply a binary input vector by a binary weight matrix. The nominal maximum size of the input vector depends on the number of rows in the CIM array and the nominal maximum size of the output vector depends on the number of columns in the CIM array. This configuration—where the CIM array is large enough to perform the entire matrix-vector multiplication in one compute cycle—may be referred to as a non-shared unlimited configuration. Notably, however, a neural network layer can implement a matrix-vector multiplication that requires a larger array than is nominally available if additional measures are taken to split up and recombine the operations. If the CIM array has an insufficient number of rows, then these measures can include splitting the matrix-vector multiplication horizontally into several parts, digitizing the outputs of the multiplications using ADCs, and then adding them. In case the CIM array has an insufficient number of columns, the matrix-vector multiplication may be split vertically (without requiring digitizing intermediate results with ADCs). A combination of both short-comings is also possible. In any of these cases, either multiple CIM arrays are used together in what may be called a non-shared limited configuration, or a single CIM array may be used multiple times in what may be called a shared configuration, to perform the full matrix-vector multiplication.

For a general-purpose CIM chip, it cannot be assumed that it will always have the right amount of individual CIM arrays available to map any neural network architecture. One exemplary approach is to have only one CIM array on the chip and iteratively load and unload the neural network weights into the array as needed to process the portions of the matrix-vector multiplication. Although this approach increases the number of data transfers, that number is still significantly less than the equivalent operation on an all-digital non-CIM device.

Similar considerations apply to convolutional neural network layers. For a convolutional layer, each entry of an output feature map is computed in a separate execution of the matrix-vector product along the lines described above. A notable drawback of using a conventionally trained neural network on a binary computation device such as a CIM device is that its predictive performance will be significantly degraded, since the binary computation of the CIM device is different from the digital domain in which and for which the model has been trained. PVT influences, ADC quantization, and noise correlations due to the re-use of CIM arrays result in execution environments that are different from a digital device, different from one CIM device to another, and different between subsequent executions on the same CIM device.

Accordingly, systems and methods to improve the accuracy of convolutional neural networks on binary systems such as CIM devices would be desirable. As described further herein, such methods include accounting for effects of noise in the training of neural networks destined for use on a binary system so that the resultant neural network models are better suited for operations using CIM arrays. In other words, the training process includes simulating noise effects of CIM devices.

FIG. 1 is a simplified schematic diagram of an exemplary electronic computational device 100. Device 100 comprises one or more CIM modules 101, such as exemplary CIM modules 101(1) and 101(2). The device 100 may also comprise a processor 102, a memory module 103, and an I/O module 104. These, and other components (not shown) of the device 100, may be interconnected with a bus, fabric, or other interconnect (not shown). Each CIM module 101 includes a CIM array 105, an input module 106, and an analog-to-digital converter (ADC) module 107, such as the illustrated exemplary CIM array 105(1), input module 106(1), and ADC module 107(1).

The input module 106 routes input from digital components of the device 100, such as, for example, the processor 102 or the memory 103, for use by the cells of the CIM array 105. In some embodiments, the input module 106 includes one or more digital-to-analog converters (DACs) to convert digital input signals into analog signals for use by cells of the CIM array 105. The ADC module 107 converts analog outputs of the CIM array 105 into digital outputs for provision to digital components of the device 100, such as the processor 102 or the memory 103. The device 100 may be, for example, in the form of a system on a chip (SoC). The device 100 may include additional components and/or chips (not shown) and itself be a mobile computing device or an IoT device. The CIM array 105 may be used by the device 100 to perform convolution operations such as, for example, those used in neural-network inferencing.

Figure 2:
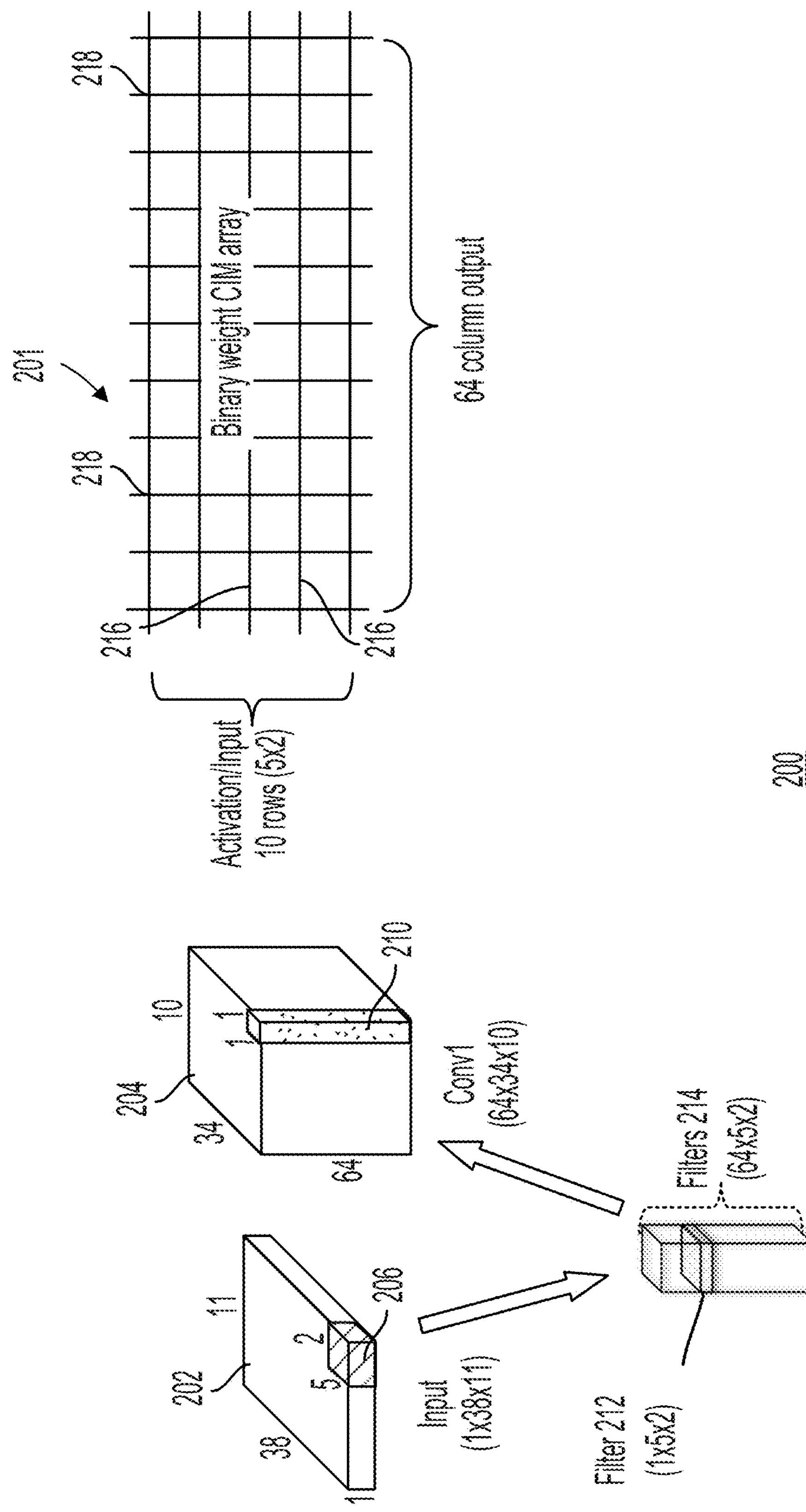
FIG. 2 illustrates an exemplary binary CIM system using a CIM array such as, for example, the CIM array of FIG. 1.

FIG. 2 illustrates an exemplary binary CIM system 200 using a CIM array 201 such as, for example, CIM array 105(1) of FIG. 1. An exemplary input 202 to a layer of the convolutional layer system 200 has dimensions of one by thirty-eight by eleven (1 (depth)×38 (height)×11 (width)). The layer has sixty four (64) output channels and, correspondingly, 64 filters, represented by the exemplary 64-filter tensor 214.

Each filter, e.g., exemplary filter 212, of the 64 filters of tensor 214, has dimensions of one by five by two (1×5×2) (altogether, the 64 filters of tensor 214 make up one 64×5×2 tensor). Each 1×5×2 filter, e.g., filter 212, is convolved with the input 202 to generate one 1×34×10 segment of an output 204 (altogether, output 204 is a tensor of dimensions 64×34×10). Each 1×34×10 segment of the output 204 represents three thousand four hundred (3400) XNOR operations for 340 5×2 receptive fields of the input 202—such as exemplary receptive field 206—and the corresponding filter—such as exemplary filter 212, using a stride of one (1×1).

The six hundred and forty (640) weights of the filter tensor 214 (64×5×2) may be stored in 640 corresponding cells of the CIM array 201, which has at least 10 rows and 64 columns. Each column of the CIM array 201 may store the ten values of a corresponding filter 212, essentially transforming the 2-dimensional (5×2) filter 212 into a one-dimensional (10×1) vector using any suitable mapping. Note that, for simplicity, the CIM array 201 is illustrated in FIG. 2 with only a few lines for the input and the output representing, respectively, the rows and columns of the CIM array 201.

Over three hundred and forty (340) operational cycles, the ten (10) values of each of the 340 5×2 receptive fields (e.g., receptive field 206) of the input 202 are input to the CIM array 201 using the wordlines 216. Note that each 2-dimensional (5×2) receptive field is essentially transformed into a one-dimensional (10×1) vector using the same mapping that is used for the filter. The values of the receptive field are XNORed with the corresponding weights of all 64 columns. The results of each column are summed and compared to a threshold to determine the binary output for the column, with the results for all the columns aggregated to form a 1×1×64 output tensor (e.g., output tensor 210), which forms a part of the output tensor 204 for the layer. The output tensor 204 corresponds to an aggreggation of the 340 1×1×64 output tensors for the 340 corresponding receptive fields (e.g., receptive field 206) of the input 202. Note that, in alternative implementations, the size of output tensor 204 may be reduced by, for example, using a larger stride, or dilated convolutions.

Figure 3:
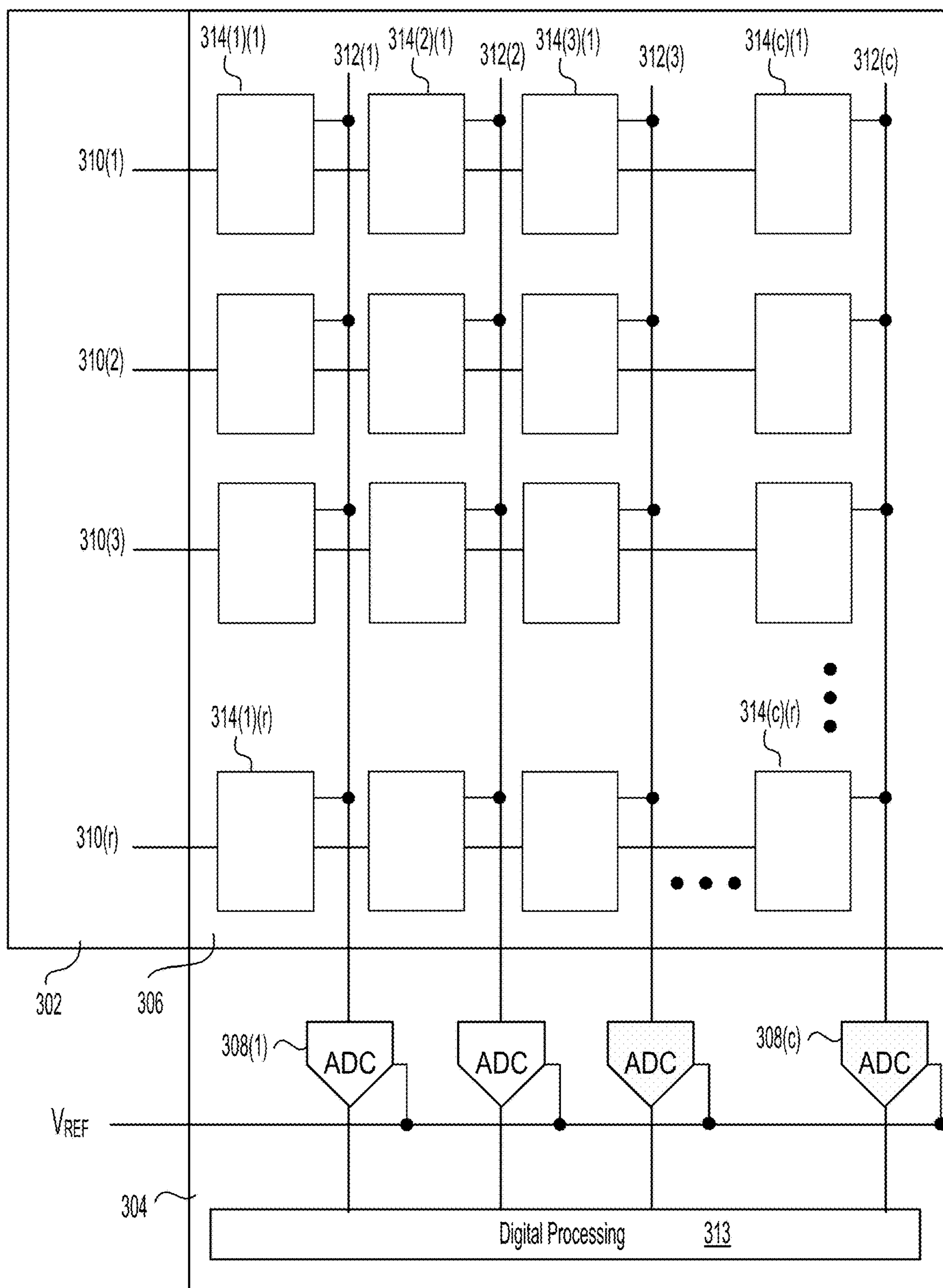
FIG. 3 is a simplified schematic diagram of an exemplary CIM module, which may correspond to, for example, the CIM module of FIG. 1.

FIG. 3 is a simplified schematic diagram of an exemplary CIM module 300, which may correspond to, for example, the CIM module 101 of FIG. 1. The CIM module 300 includes an input module 302, an ADC module 304, and a CIM array 306. The CIM array 306 comprises c columns and r rows of CIM cells 314(1)(1)-314(*c*)(*r*), wherein each CIM cell 314(*i*)(*j*) is configured to store a corresponding weight value and multiply it with a received input value. Note that, as noted elsewhere herein, the multiplication of binary weight and input values may be performed using an XNOR operation. The CIM array 306 may correspond to, for example, the CIM array 105 of FIG. 1 or the CIM array 201 of FIG. 2. Each input values is received by a row i of of the CIM array 306—and, correspondingly, by the c CIM cells 314(1)(*i*)-314(*c*)(*i*) of row i—from the input module 302 via a corresponding input line 310(*i*). Each CIM cell 314 comprises a capacitor that is charged if the result of the XNOR operation is 1 and discharged if the result is 0.

The results of the XNOR operations by the CIM cells 314(*j*)(1)-314(*j*)(*r*) of each column j are output to a corresponding read bitline 312(*j*), such as, for example, read bitline 312(1) for column 1. The outputs for the CIM cells 314(*j*)(1)-314(*j*)(*r*) of a column j—in the form of corresponding capacitances—are summed by the corresponding bitline 312(*j*) and provided as an input indicative of population count to a corresponding ADC 308(*j*) in the ADC module 304. Notably, due to phenomena such as capacitor mismatch and thermal effects, the relationship between the total voltage and the population count is subject to noise. Additionally, since the maximal voltage increase across a bit line is independent of the number of wordlines within the array, as the array size increase, a difference of one in the population count corresponds to a smaller difference of voltage as measured from the bitline. Each ADC 308 also receives a reference voltage $V_{REF}$ for use as a threshold to determine a corresponding output value. Note that an ADC 308 with a 1-bit resolution is equivalent to a comparator. Note, however, that an ADC 308 may alternatively be a multi-bit ADC or a variable-resolution ADC. The outputs of the ADCs 308 are provided to digital processing module 313 for further processing, where the further processing may include operations for multi-bit implementations, operations to split up array processing, or operations corresponding to batch normalization, pooling, or applying non-linearities.

As noted above, the analog operations and conversions in a CIM device introduce various noises such as capacitor variation, thermal noise, and offset noise. The capacitor variation may be fixed per CIM array, but may depend on a particular population count for an operation. Thermal noise varies for each computation. Offset noise may be fixed per CIM array and be added at each activation. Reusing a CIM array, as in the sharing configuration, may introduce correlated noises of capacitor variation and offset. These various noise effects should be accounted for during training in order to generate an accurate model.

In order to train neural network models that are robust to CIM specific effects, a low-level circuit simulation (e.g. SPICE) of a CIM array is generated in order to have a low-level noise model, which is abstracted into a high-level differentiable CIM-array simulator. The CIM array simulation is then integrated into a CIM chip simulator.

The low-level circuit simulations include a CIM array of N word lines and a single bit line. The cell weights are randomly initialized to 0 or 1. Subsequently, all rows are activated in sequence by switching the corresponding word-line such that XNOR evaluates to 1. For each word-line activated in this way, the bit-line voltage corresponding to a pop-count from 0 to N is read out. After this bit-line voltage vs. population count characterization is done at a typical case, Monte Carlo simulations are used to generate bit-line voltage variations at each individual population count in [0, N] according to the hardware noise model.

Based on these low-level simulations, the CIM array noises acting on the clean population count computation a may be characterized for a particular column into three zero-mean normally distributed sources α, β, and γ such that $$\tilde{a} = \alpha a + \beta + \gamma \qquad \text{(equation 1)}$$

where ã is the population count with noise. These noise sources originally influence computation in the voltage domain. Consequently, a standard deviation $\sigma'_\epsilon$ in the voltage domain is translated from the voltage domain into the population-count domain through the below equation (2), where Δv corresponds to the maximum voltage difference across a bit-line and N corresponds to the number of rows in the CIM array.

$$\sigma_\epsilon = \frac{\sigma'_\epsilon \cdot N}{\Delta v}\left[\frac{V \cdot P_{cnt}}{V}\right] \qquad \text{(equation 2)}$$

These noise sources are distinguished depending on their origin and how they affect a. Firstly, CIM computations are stochastic across the distribution of all CIM arrays produced. Stochasticity enters at the point of manufacturing in the form of process variations. For a given instantiation of a CIM array, a sample from these noise sources may be drawn and may influence the array's subsequent computations in a deterministic manner. Specifically, α covers charge capacitance variations and affects the population-count computation as data-dependent multiplicative noise $\mathcal{N}(0, \sigma_\alpha(\alpha))$. β subsumes additive noises such as offset variations. Secondly, γ subsumes noise sources such as thermal fluctuations that are applied to every read-out of a CIM array's column. The magnitudes of these noise sources are determined by the entirety of hardware design and assumptions modeled. Note that, in addition to noise sources of these types, alternative implementations may include noise sources whose characteristics may fall in-between, such as, for example, 1/f noise and non-linearities.

FIG. 4 shows an exemplary algorithm 400 for the simulated process of executing a convolution operation on a CIM chip in a non-shared setting—in other words, assuming access to an arbitrary number of arrays of a fixed size. The simulation controls how input activations and elements of each layer's weight matrix are routed to the one or more CIM arrays. As described elsewhere herein, the algorithm 400 shows the splitting up, if necessary, of the input, the performance of XNOR operations, the injections of various types of noises, the conversions between the voltage domain and the population-count domain, the comparison with a threshold (digital or analog, depending on whether the input needs to be split up or not), and the output of feature map results. Note that the execution of a fully connected layer is analogous, but without the additional step of flattening the kernel and each input patch.

As previously described, depending on the size of the convolutional or fully connected layer in relation to the CIM array size, the CIM chip operates differently. When the kernel volume does not exceed the height of the array, the ADC operates as a comparator to directly produce the binary input to the following layer. Alternatively, the matrix-vector operation is split across several CIM arrays and the partial population counts are digitized using the ADC in order to be summed in the digital domain. The training simulations may be used to adjust the design of the CIM chip by trying different array heights to compromise between reduced ADC use and reduced resolution and signal-to-noise ration (SNR).

If the number of output channels exceeds the number of columns in a CIM array, then output channels will be mapped to different arrays and the corresponding input patch presented to each of these arrays. Since CIM noises are assumed to be independent across columns, this horizontal splitting of the kernel does not need to be explicitly modeled in the non-shared scenario. In the shared CIM array scenario however, the algorithm 400 may be modified slightly as follows. Firstly, after the execution of a layer, its kernel is unloaded to free the array for execution of the subsequent layer. Secondly, horizontally splitting the kernel requires unloading and loading these different kernel parts and computing all output feature maps in multiple steps. In the non-shared case, process variation noises α and β induce systematic error only across the entries of a feature map. In the shared case however, the same column is re-used multiple times also between layers, between different feature maps (horizontal splitting) and across partial convolutions when splitting vertically.

As noted earlier, an important principle for training neural networks for CIM applications is exposing the neural network, during the training, to the environment it will be exposed to at test time. If a network is trained to perform well across the distribution of all, or a wide range of, possible chips during training, then it will perform well on a test chip that is drawn from the same distribution as the multitude of simulated CIM chips during training, provided that the simulations approximate reality well enough. This also applies to low-bit quantization.

Some implementations use probabilistic binary neural networks (PBNNs) for training binary layers. Training and using PBNNs is described in Peters, J. W. and Welling, M., *Probabilistic binary neural networks*, published at arXiv: 1809.03368 (2018) and incorporated herein by reference in its entirety. In essence, during training, the weights of a PBNN are managed as probability distributions—particularly the probabilities that the weights are either 0 or 1. So instead of learning the particular values of weights directly, the network learns the probabilities of the weights having those values. An embodiment of multi-bit quantization of a network's first layer may use relaxed quantization as described in Louizos, C., Reisser, M., Blankevoort, T., Gavves, E., and Welling, M., Relaxed quantization for discretized neural networks, published at arXiv:1810.01875 (2018), incorporated herein by reference in its entirety.

Both methods use the idea of modeling a network's weights as random variables, whose support lies on the possible values that the quantized weight can take on at test time. Rather than quantizing weights during training directly, a probabilistic treatment allows avoiding using the biased straight-through estimator for gradient computation. Instead, relaxed quantization uses the concrete distribution to sample weights while slowly annealing the variance of the distribution during training. PBNN avoids sampling by directly approximating the result of the layer's linear operation with probabilistic weights having a Gaussian distribution (central limit theorem). Some embodiments integrating CIM-aware training and quantization-aware training operate only on the binary layers. Other embodiments may also operate on multi-bit layers. For the training of high-performing binary models for CIM devices, PBNN models are extended to be CIM aware.

FIG. 5 shows an exemplary algorithm 500 describing the CIM training procedure from the view-point of an implementation in a deep learning framework. During training with a PBNN, weights ŵ and activations x̂ are assumed to lie in {−1, +1}. As such, we need to map the Gaussian pre-activations $\hat{a} \sim \mathcal{N}(\mu_a, \sigma_a^2)$ that are a result of the central limit theorem approximation, to a population count of XNOR operations performed in the {0, 1} domain for weights w and activations x. At test time, the transformation between domains is described by equation (3) below for a kernel j—corresponding to a column j in a CIM array.

$$PCNT_i^{N_{in}}(xnor(x_i, w_{ij})) = \frac{1}{2}\Sigma_i^{N_{in}}\hat{x}_l \cdot \hat{w}_{ij} + \frac{N_{in}}{2} \quad \text{(equation 3)}$$

At training time, the equivalent Gaussian pre-activation population count a is obtained by applying the same transformation to the Gaussian pre-activations $$a = \mathcal{N}\left(\frac{\mu_a}{2} + \frac{N_{in}}{2} + \frac{1}{4}\sigma_a^2\right) \quad \text{(equation 4)}$$

After mapping the PBNN computation to the equivalent CIM array computation, the operation proceeds to integrate the simulation noise model described by equation (1). During forward propagation, the noise sources α, β, and γ are sampled and applied to a feature map of gaussian pre-activations a.

In one embodiment of the simulation, the situation in which the length of the flattened kernel exceeds the number of rows N in a CIM array may be explicitly modeled. In this case, the ADC is simulated with a quantized to $2^b$ evenly spaced values between 0 and N. During training, a is a Gaussian random variable and consequently, a reparameterization trick may be used to sample from a before rounding or a probabilistic alternative such as relaxed quantization may be used. Note that sampling in combination with a straight-through estimator may be advantageous as it avoids the computationally expensive probabilistic relaxation of relaxed quantization. Upon adding all quantized partial pre-activations, the transformation of equation (3) is undone and the probability of stochastic binary activations is formulated as a difference from a threshold θ. In case of a sufficiently large CIM array, one may proceed with the PBNN binarization procedure of computing the probability mass that lies above the threshold θ.

Many applications require the input and first layer's weights to be in multi-bit precision to avoid unacceptable loss of predictive performance. For example, in one implementation, while the hidden layers may have binary inputs and weights, the first layer receives 4-bit inputs and uses 2-bit weights. Depending on various considerations, such as the input size, required bit-widths, and power profiles of the hardware, the first layer may be executed within the CIM module using multi-bit adaptation for binary CIM arrays or, alternatively, in the digital domain by an upstream digital processor such as, for example, CPU 102 of FIG. 1. It should be noted that in some embodiments, the simulations add noise only to the binary layers and so do not add noise to, for example, a multi-bit first layer. A convolution with input and kernel quantized to a uniform grid can be implemented as integer multiplications and additions with proper treatment of grid scales and zero-offsets. For integer convolution on binary CIM hardware, an integer convolution can be implemented as a weighted sum of binary convolutions as shown in equation (5).

$$\Sigma_i^{N_{in}} x_i \cdot w_i = \Sigma_i^{N_{in}} (2^{b_x-1} x_{i,b_x-1} + \cdots + 2^0 x_{i,0}) \cdot (2^{b_w-1} w_{i,b_w-1} + \cdots + 2^0 w_{i,0}) \quad \text{(equation 5)}$$

On CIM hardware, each binary operation may be executed on a CIM array, digitized using ADCs and in-digital scaled and summed for computation of the final result.

Figure 6:
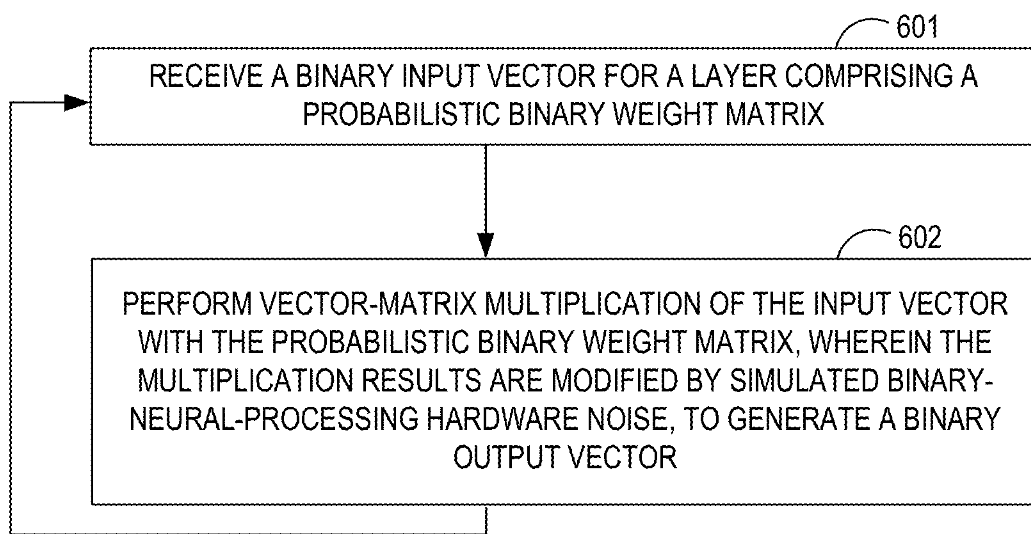
FIG. 6 is a flowchart of an exemplary process in accordance with an embodiment of the disclosure.

FIG. 6 is a flowchart of an exemplary process 600 in accordance with an embodiment of the disclosure. The process 600 starts with receiving a binary input vector for a layer comprising a probabilistic binary weight matrix (step 601). The process continues with performing vector-matrix multiplication of the input vector with the probabilistic binary weight matrix, wherein the multiplication results are modified by simulated binary-neural-processing hardware noise, to generate a binary output vector (step 602). The process may then repeat by returning to step 601. The process 600 may be performed by, for example, an electronic computer comprising a processor and a connected memory.

As noted above, the insights from the simulations may be used to adjust the design of a neural network model for a CIM device. Since an important bottleneck is the number of required ADC evaluations, those are reduced by reducing kernel volumes L to be less than or equal to the number of rows N in a CIM array, such as CIM array 306 of FIG. 3. Operating ADCs as binary comparators requires less energy and requires only one DAC evaluation for the threshold per input patch. The kernel volume may be kept not greater than N by standardizing the shape of the convolutional filters for all except the first layer, keeping the total number of computations per filter to be less than N. For the first layer, as the input depth is usually 3 or smaller, it's relatively easy to keep the kernel volume below N even with large kernels. In some embodiments, enlarged stride lengths and/or dilated convolutions are used for the first layer in order to reduce the size of the output. Large kernel sizes and strides may be used early in the network to additionally keep low the memory requirements for storing binary feature maps.

As described above, problems of training vs. test time mismatch may be addressed by using a simulator that reproduces relevant characteristics of the hardware. The simulator is differentiable, stochastic, and implemented using deep-learning frameworks such as, for example, Pytorch, the open-source machine-learning framework developed by Facebook, Inc. of Menlo Park, CA, which allows its integration into accelerated training pipelines. Along with a simulation of ADCs, there is explicit consideration of correlation due to CIM array re-use as described above. Furthermore, the neural network training procedure may be used to drive hardware design. Notably, because of special considerations for the input and first layer, there are multiple ways to accommodate alternative processing of the first layer by a CIM device.

The above detailed description set forth above in connection with the appended drawings describes examples and does not represent the only examples that may be implemented or that are within the scope of the claims. The terms "example" or "exemplary," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

It is also noted that the operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative circuits described in connection with aspects described herein may be implemented in or with an integrated circuit (IC), such as a processor, a digital signal processor (DSP), an application-specific integrated circuit (ASIC), a field-programmable gate array (FPGA), or other programmable logic device. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of training an artificial neural network based on simulated properties of a binary neural network processor, comprising:

receiving a binary input vector for a layer of the artificial neural network comprising a probabilistic binary weight matrix;

generating simulated binary-neural-processing hardware noise based on permutations of properties of the binary neural network processor;

performing vector-matrix multiplication of the input vector with the probabilistic binary weight matrix;

modifying the multiplication results based on the simulated binary-neural-processing hardware noise, to generate a binary output vector; and forward propagating the binary output vector to one or more other layers of the artificial neural network.

2. The method of claim 1, wherein the binary neural network processor is a compute-in-memory (CIM) device.

3. The method of claim 1, wherein the probabilistic binary weight matrix comprises probabilities that the weights are 0 or 1.

4. The method of claim 1, wherein the simulated binary-neural-processing hardware noise simulates process, voltage, and temperature (PVT) variations of the simulated binary-neural-processing hardware.

5. The method of claim 4, wherein the thermal noise is varied for each multiplication.

6. The method of claim 4, wherein:

the PVT variation noise includes capacitor variation noise;

generating the binary output vector comprises calculating a population count; and capacitor variation noise depends on the population count.

7. The method of claim 1, wherein:

generating the binary output vector comprises calculating a population count with noise $\tilde{a}$;

$$\tilde{a}=\alpha a+\beta+\gamma;$$

a is a clean population count;

$\alpha$ represents capacitor variation noise;

$\beta$ represents offset variation noise; and $\gamma$ represents thermal noise.

8. The method of claim 1, wherein:

the layer is larger than a processing array of the binary neural network processor;

the binary neural network processor comprises analog-to-digital converters (ADCs);

performing the vector-matrix multiplication comprises splitting the layer and generating intermediate results digitized by the ADCs; and the simulated binary-neural-processing hardware noise includes quantizing noise from digitizing the intermediate results by the ADCs.

9. The method of claim 1, wherein:

performing the vector-matrix multiplication comprises using the binary neural network process in a sharing configuration; and the simulated binary-neural-processing hardware noise includes correlated noise for the sharing configuration.

10. The method of claim 1, wherein the simulated binary-neural-processing hardware noise is generated from a low-level circuit simulation of the binary neural network processor.

11. The method of claim 1, wherein:

the artificial neural network comprises a first layer and a plurality of additional layers;

the probabilistic binary weight matrix may correspond to any of the plurality of additional layers; and the probabilistic binary weight matrix may not correspond to the first layer.

12. An apparatus comprising a processor and a memory, the apparatus configured to train an artificial neural network based on simulated properties of a binary neural network processor, the training comprising:

receiving a binary input vector for a layer of the artificial neural network comprising a probabilistic binary weight matrix;

generating simulated binary-neural-processing hardware noise based on permutations of properties of the binary neural network processor;

performing vector-matrix multiplication of the input vector with the probabilistic binary weight matrix;

modifying the multiplication results based on the simulated binary-neural-processing hardware noise, to generate a binary output vector; and forward propagating the binary output vector to one or more other layers of the artificial neural network.

13. The apparatus of claim 12, wherein the binary neural network processor is a compute-in-memory (CIM) device.

14. The apparatus of claim 12, wherein the probabilistic binary weight matrix comprises probabilities that the weights are 0 or 1.

15. The apparatus of claim 12, wherein the simulated binary-neural-processing hardware noise simulates process, voltage, and temperature (PVT) variations of the simulated binary-neural-processing hardware.

16. The apparatus of claim 15, wherein the thermal noise is varied for each multiplication.

17. The apparatus of claim 15, wherein:

the PVT variation noise includes capacitor variation noise;

generating the binary output vector comprises calculating a population count; and capacitor variation noise depends on the population count.

18. The apparatus of claim 12, wherein:

generating the binary output vector comprises calculating a population count with noise $\tilde{a}$;

$$\tilde{a}=\alpha a+\beta+\gamma;$$

a is a clean population count;

$\alpha$ represents capacitor variation noise;

$\beta$ represents offset variation noise; and $\gamma$ represents thermal noise.

19. The apparatus of claim 12, wherein:

the layer is larger than a processing array of the binary neural network processor;

the binary neural network processor comprises analog-to-digital converters (ADCs);

performing the vector-matrix multiplication comprises splitting the layer and generating intermediate results digitized by the ADCs; and the simulated binary-neural-processing hardware noise includes quantizing noise from digitizing the intermediate results by the ADCs.

20. The apparatus of claim 12, wherein:

performing the vector-matrix multiplication comprises using the binary neural network process in a sharing configuration; and the simulated binary-neural-processing hardware noise includes correlated noise for the sharing configuration.

21. The apparatus of claim 12, wherein the simulated binary-neural-processing hardware noise is generated from a low-level circuit simulation of the binary neural network processor.

22. The apparatus of claim 12, wherein:

the artificial neural network comprises a first layer and a plurality of additional layers;

the probabilistic binary weight matrix may correspond to any of the plurality of additional layers; and the probabilistic binary weight matrix may not correspond to the first layer.

23. A non-transitory computer-readable medium storing computer-executable code for operation of a neural network, comprising code to train an artificial neural network based on simulated properties of a binary neural network processor, the training comprising:

receiving a binary input vector for a layer of the artificial neural network comprising a probabilistic binary weight matrix;

generating simulated binary-neural-processing hardware noise based on permutations of properties of the binary neural network processor;

performing vector-matrix multiplication of the input vector with the probabilistic binary weight matrix;

modifying the multiplication results based on the simulated binary-neural-processing hardware noise, to generate a binary output vector; and forward propagating the binary output vector to one or more other layers of the artificial neural network.

* * * * *